United States Patent [19]

Gebel et al.

[11] 3,812,627
[45] May 28, 1974

[54] PRESSURE INDICATING DEVICE FOR HYDROSTATIC BEARINGS

[75] Inventors: Kurt M. Gebel; Ralph E. Price, both of Waynesboro, Pa.

[73] Assignee: Landis Tool Company, Waynesboro, Pa.

[22] Filed: Dec. 29, 1972

[21] Appl. No.: 319,462

[52] U.S. Cl.............. 51/238 R, 308/1 A, 184/1 C, 137/557, 116/70
[51] Int. Cl.... B24b 41/06, F16c 13/00, G01l 19/12
[58] Field of Search........ 51/238 R, 139.5 F; 82/31; 308/1 A, 122; 184/1 B, 1 C; 73/37.3; 137/557; 285/93; 116/70

[56] References Cited
UNITED STATES PATENTS

| | | | |
|---|---|---|---|
| 2,615,419 | 10/1952 | Topping | 184/1 C |
| 2,937,056 | 5/1960 | Rink | 184/1 C |
| 3,180,661 | 4/1965 | Porath | 308/122 |
| 3,365,711 | 1/1968 | Levesque | 308/1 R |
| 3,416,560 | 12/1968 | Bruno | 137/557 |

Primary Examiner—Al Lawrence Smith
Assistant Examiner—Robert C. Watson
Attorney, Agent, or Firm—Spencer T. Smith

[57] ABSTRACT

A hydrostatic bearing assembly for a grinding machine comprising a head stock including at least one bearing housing, the bearing housing having a cylindrical bore for receiving a rotatable spindle and a plurality of circumferentially spaced, axially extending pads established in the cylindrical wall of the bore, a corresponding plurality of fluid manifolds, means for establishing parallel fluid flow paths between the plurality of bearing housing pads and the corresponding plurality of fluid manifolds, means for supplying pressurized liquid to the plurality of fluid manifolds and means for sensing when the pressure of the fluid flowing to any one of the plurality of bearing housing pads is less than a predetermined minimum pressure and means for stopping or preventing the operation of the grinding machine when the sensed pressure of the fluid flowing to any one of the plurality of bearing housing pads is less than the predetermined minimum pressure.

4 Claims, 4 Drawing Figures

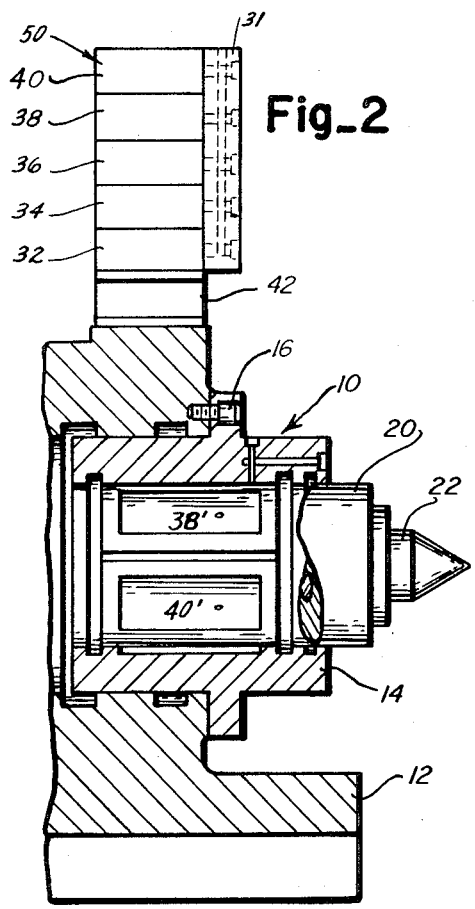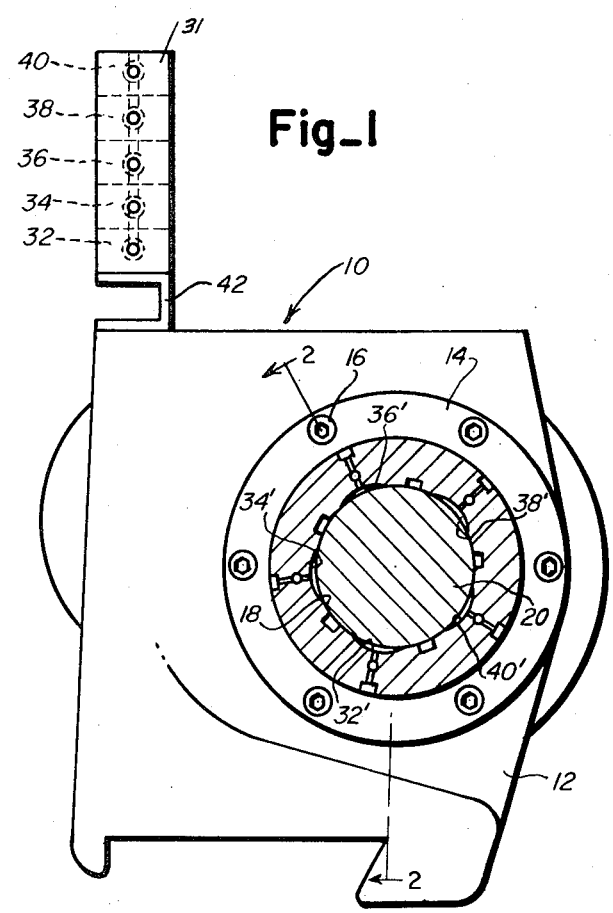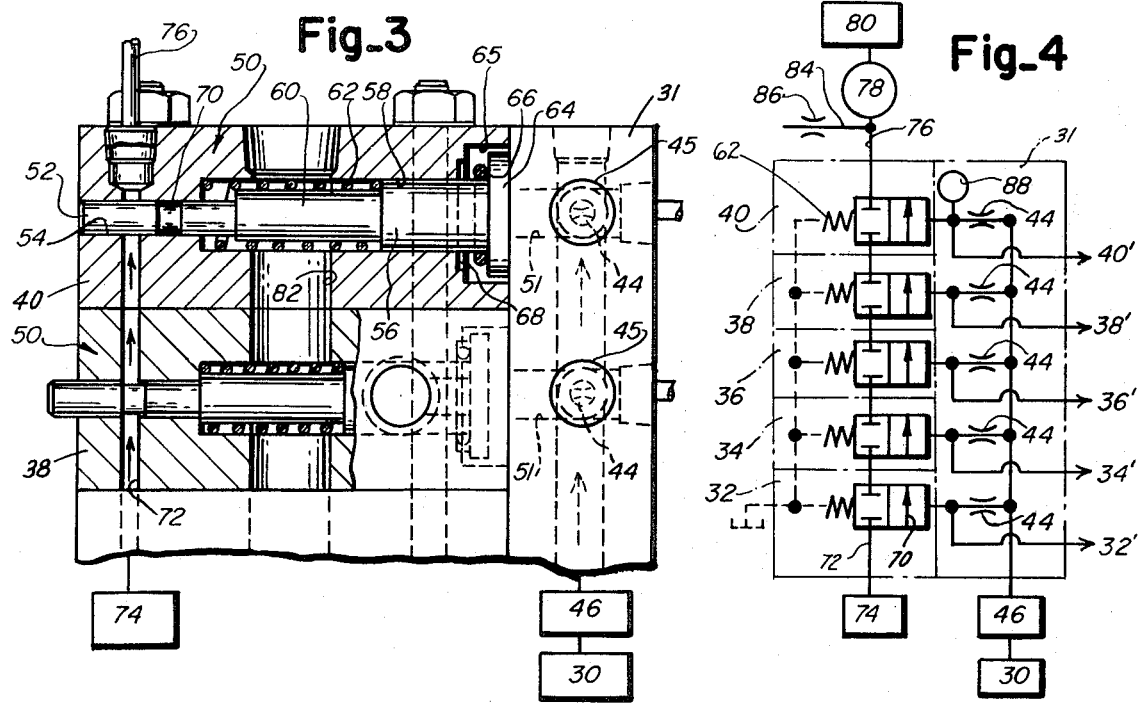

PRESSURE INDICATING DEVICE FOR HYDROSTATIC BEARINGS

This invention relates to hydrostatic bearings for use in machine tools such as grinding machines.

When it is desired to remove heavy stock from a workpiece during a grinding cycle and particularly where it is desirable to provide equipment to counteract the extreme forces from a grinding wheel in order to remove stock rapidly from continuous or interrupted surfaces, hydrostatic bearings provide excellent characteristics and are ideally suited for such applications. The transverse motion of a hydrostatic bearing, by its inherent design, presents ideal characteristics, when it is desirable to withdraw one or both work supporting centers for loading clearance.

While hydrostatic bearings are well known in their utilization in conjunction with grinding machines, their use has been limited to applications where wheel pressure is only moderate. A high production machine having extreme forces between the grinding wheel and the workpiece may require considerable cost and "downtime" to correct any bearing failure. This occurs when the flow of supporting oil to any of the recess pads of the bearing housing is below normal operating levels or when blockage of oil to any bearing pad occurs, which could damage the spindle or bearing through metal to metal contact.

This problem is increased when grinding interrupted surfaces such as circumferentially spaced lugs as the extreme forces against the workpiece are varied. Also, the spindles must be stabilized by an adequate volume of supporting oil at each recess pad in order to provide an acceptable ground workpiece.

It is accordingly, an object of the present invention to provide a hydrostatic bearing for a grinding machine wherein the flow of fluid to each of the bearing housing pads is separately monitored and the machine stopped whenever a predetermined minimum flow is not supplied to any one of the bearing housing pads.

It is another object of the present invention to provide a grinding machine wherein the pressurized liquid flows to the bearing housing pads through parallel flow lines each including a fluid restrictor and wherein whenever blockage of one or more of these restrictors causes machine stoppage appropriate signals will be provided to identify these blocked restrictors.

Among the advantages of the present invention is the provision of a grinding machine having one or more hydrostatic bearings for supporting the workpiece wherein the machine will be stopped before damage can occur due to the blockage of pressurized fluid flow to the bearing and wherein the blockage can be immediately repaired with a minimum of machine downtime.

Other objects and advantages of the present invention will become apparent from the following portion of this specification and from the accompanying drawings which illustrate, in accordance with the mandate of the patent statutes, a presently preferred embodiment incorporating the teachings of the invention.

Referring to the drawings:

FIG. 1 is an end view, partly in section of a hydrostatic bearing assembly made in accordance with the teachings of the present invention;

FIG. 2 is a view, partly in section of the hydrostatic bearing assembly illustrated in FIG. 1 taken along the line 2—2 thereof;

FIG. 3 is an enlarged view, partly in section of a portion of the hydrostatic bearing monitoring assembly illustrated in FIG. 2, and FIG. 4 is a schematic view illustrating the hydrostatic bearing assembly made in accordance with the teachings of the present invention.

Referring to the drawings and initially to FIGS. 1 and 2, the elements of a head or foot stock 10 for a machine tool such as a grinding machine (not shown) are illustrated. The headstock includes a base member 12 at least one bearing housing 14 which is secured to the base membr by a plurality of fasteners 16 and which has a substantially cylindrical bore 18 for receiving a rotatable spindle 20, and a work center 22 mounted on the terminal end of the spindle for rotatably supporting one end of a workpiece or arbor assembly (not shown).

The rotatable spindle is hydrostatically supported during the machining operation by pressurized fluid which is directed from a suitable source 30 into a vertical valve member 31 which is secured to a plurality of fluid manifolds 32, 34, 36, 38, 40, in parallel, which are vertically stacked and mounted on a head stock bracket 42 and into a plurality of circumferentially spaced, axially extending bearing recesses or pads 32', 34', 36', 38', 40', which are defined in the inner cylindrical wall 18 of the bearing housing 14. Each bearing recess accordingly receives pressurized liquid from a single corresponding manifold.

A fluid flow restrictor or orifice 44 (FIGS. 3 and 4) is placed in each of the flow lines passing through the manifolds and the diameter of these orifices is selectively choosen so that when a force is applied to the spindle which would tend to alter the orientation thereof, the fluid which is hydrostatically supporting the spindle cannot be instantaneously forced out of one or more of the bearing housing pads. The fluid will accordingly be gradually forced therefrom at a rate controlled by the size of the orifices and the hydrostatic fluid support system is thereby provided with a degree of stiffness to properly accommodate a predetermined range of forces having predetermined rates of application.

Since the manifolds are vertically stacked on top of the head stock each orifice may be easily removed and replaced, in the event it becomes blocked, by removing a plug 45 in the head of the manifold. A filter 46 may be provided to remove particles from the flow line which could clog these orifices.

A system (FIGS. 3 and 4) is provided for sensing whether and to what extent fluid is flowing through each of the orifices and for stopping or preventing the rotation of the spindle in the event the pressure of the fluid flowing to any one of the plurality of bearing housing pads is less than a predetermined minimum pressure.

Each fluid manifold forms a pressure cylinder 50 in fluid communication therewith via an inlet port 51 downstream of the orifice. The cylinder includes a piston rod 52 which is slidably displaceable within a pilot bore 54 and a piston head 56 which is slidably displaceable in a second coaxial bore 58. A portion of the piston head 60 is stepped in order that a compression spring 62 can be placed therearound to forcefully urge the piston towards a retracted position illustrated in conjunction with manifold 40 in FIG. 3, where a sealing flange 64 which is in coaxial, spaced relation with a third bore 65 will effectively close the inlet port 51 to the fluid cylinder.

When the corresponding orifice is clogged or otherwise blocked, no fluid pressure will be sensed by the sealing flange 64. Accordingly, the force exerted by the compression spring 62 will displace the piston to its retracted position.

When the orifice is operating in the desired manner, the fluid pressure is sensed by the sealing flange 64 and this pressure is sufficient to displace the piston head to an advanced position which is illustrated in conjunction with manifold 38 in FIG. 3. An O-ring 66, which then becomes forcefully compressed between the piston head and the second coaxial bore shoulder 68 effectively seals the second coaxial bore 58 thereby preventing fluid from entering thereinto.

The pilot bore 54 of each cylinder communicates with the exterior cylinder wall and the piston rod 52 has a selected length so that when the piston is in the advanced position a portion of the piston rod will project beyond the exterior cylinder wall thereby providing a visual indication that the corresponding orifice is functioning in the desired manner.

A reduced diameter portion 70 of the piston rod will be aligned with a vertical bore 72 in the cylinder, which with similar bores in the other vertically stacked cylinders, establishes a fluid conduit intermediate a source of pneumatic pressure 74 and an outlet line 76 leading to a pressure switch 78 which operates grinding cycle controls 80.

During the machining operation, should any orifice become blocked and the corresponding piston displaced to its retracted position, the piston rod will effectively block the vertical bore 72 and accordingly, the pneumatic pressure will not be sensed by the pressure switch 78.

The opening of the pressure switch 78 will actuate the grinding cycle controls 80 to either prevent initiation of or to halt the grinding cycle.

A vertical bore 82 in each cylinder will serve as a gravity drain line for any oil which may leak past the sealing flange 64. A line 84 (FIG. 4) is coupled to the outlet line 76 to permit rapid exhaust from the pressure switch 78 and also to purge any oil which might inadvertently be directed into the outlet line 76. A restrictor 86 is sized and provided in line 84 to permit the pressure switch 78 to be opened immediately should any one of the plungers be retracted by spring pressure in the event of inadequate oil pressure in one of the bearing housing pads.

Pressure gages 88 may be interchanged with the plugs 45 to permit a pressure reading at any or all pressure pads. This will permit measurement of the oil pressure during a grinding operation to determine the rigidity of the spindle 20 during a high speed grinding operation.

An additional manifold (not shown) may be utilized to provide a signal that adequate fluid pressure is being directed against a thrust face of the spindle 26 which will provide a signal to determine a predetermined axial load against the spindle 26 and work center 29 for properly supporting a workpiece.

Having thus described our invention, what we claim is:

1. A hydrostatic bearing assembly for a machine tool comprising
    a head stock including a bearing housing, said bearing housing having a cylindrical bore for substantially slidably receiving a rotatable spindle and having a plurality of circumferentially spaced, axially extending pads established in the cylindrical wall of said bore,
    a corresponding plurality of fluid manifolds, arranged in stacked relation and each including inlet and outlet means, a fluid orifice intermediate said inlet and outlet means, and third port means downstream of said fluid orifice,
    means for establishing parallel fluid flow paths between said plurality of bearing housing pads and said corresponding plurality of fluid manifolds,
    means for supplying pressurized liquid to said plurality of fluid manifolds,
    means for sensing when the pressure of the liquid flowing to any one of said plurality of bearing housing pads is less than a predetermined minimum pressure including a corresponding plurality of fluid cylinders, each in fluid communication with the third port means of the corresponding fluid manifold and each including
    first and second coaxial bores communicating with the exterior surfaces of said cylinder,
    piston head means selectively sized for slidable displacement within said first bore,
    means for biasing said piston head means to a first position into sealing engagement with the third port means of the corresponding fluid manifold, said biasing means exerting a selected force so that the pressurized liquid flowing through the corresponding manifold will overcome said biasing means when said pressure is equal to or greater than said predetermined minimum pressure, and accordingly, will displace said piston means to a second position,
    piston rod means slidably received in said second bore and including a reduced diameter portion, and
    third bore means extending in a direction perpendicular to and communicating with said second bore and selectively located so that the third bore of each of said stacked fluid cylinders will establish a fourth bore,
    a source of pressurized air communicating with said fourth bore,
    said sensing means additionally including a pressure responsive switch in fluid communication with said fourth bore,
    the piston rod of each of said cylinders selectively blocking said fourth bore when said piston head means is in said first position and the reduced diameter portion of each of the piston rods being selectively located so as to be in fluid communication with said fourth bore only when the corresponding piston heads means is in said second position whereby the pressurized air from said source will actuate said pressure responsive switch only when all of said plurality of piston head means are in said second position, and
    means responsive to said pressure responsive switch for preventing or stopping the operation of the machine tool when the sensed pressure of the liquid flowing to any one of said bearing housing pads is less than said predetermined pressure.

2. A hydrostatic bearing assembly for a machine tool comprising
- a head stock including a bearing housing, said bearing housing having a cylindrical bore for substantially slidably receiving a rotatable spindle and having a plurality of circumferentially spaced, axially extending pads established in the cylindrical wall of said bore,
- means for supplying liquid to each of said pads at a pressure in excess of a predetermined minimum pressure including
- a corresponding plurality of fluid manifolds,
- means for establishing parallel fluid flow paths between said plurality of bearing housing pads and said corresponding plurality of fluid manifolds,
- a source of liquid pressurized to at least a selected pressure, and
- means for supplying said pressurized liquid from said source to said corresponding plurality of fluid manifolds,
- a source of pressurized fluid,
- a pressure responsive switch
- conduit means communicating with said pressure responsive switch and said source of pressurized fluid whereby said pressure responsive switch will be switched from a first condition to a second condition,
- means for disabling the machine tool when said pressure responsive switch is in said first condition, and
- means for blocking said conduit means when the pressure of the liquid to any one of said pads is less than said predetermined minimum pressure.

3. A hydrostatic bearing assembly for a machine tool according to claim 2, wherein
- each of said fluid manifolds includes inlet and outlet port means, a fluid orifice therebetween and third port means downstream of said fluid orifice, and further comprising
- a corresponding plurality of stacked fluid cylinders, each in fluid communication with the third port means of the corresponding fluid manifold and each including
- first and second coaxial bores, at least said first bore communicating with the exterior surface of said cylinder,
- piston head means selectively sized for slidable displacement within said first bore,
- means for biasing said piston head means to a first position into sealing engagement with the third port means of the corresponding fluid manifold, said biasing means exerting a selected force so that the pressurized liquid flowing through the manifold will overcome said biasing means only when said pressure is equal to or greater than said predetermined minimum pressure, and accordingly, will displace said piston means to a second position,
- piston rod means slidably received in said second bore and including a reduced diameter portion, and
- third bore means extending in a direction perpendicular to and communicating with said second bore and selectively located so that the third bore of each of said stacked fluid cylinders will establish a fourth bore, said conduit means including said fourth bore,
- the piston rod of each of said cylinders selectively blocking said fourth bore when said piston head means is in said first position and the reduced diameter portion of each of the piston rod being selectively located so as to be in fluid communication with said fourth bore only when the corresponding piston head means is in said second position whereby the pressurized air from said source will actuate said pressure responsive switch from said first condition to said second condition only when all of said plurality of piston head means are in said second position.

4. A hydrostatic bearing assembly for a machine tool according to claim 3, wherein
- said second bore of each cylinder communicates with the exterior surfaces thereof, and said
- piston rod means of each said cylinder has a selected length so that when said piston head means is displaced from said second position to said first position, said piston rod means will be displaced from a first exposed position to a second position whereby a visual indication will be provided to indicate that the pressure of the fluid flowing to the corresponding bearing housing pad is less than said predetermined minimum pressure.

* * * * *